(12) United States Patent
Brice (10) Patent No.: US 10,857,597 B2
(45) Date of Patent: Dec. 8, 2020

(54) FUNCTIONALLY GRADED METAL-METAL COMPOSITE STRUCTURES

(71) Applicant: United States of America as represented by the Administrator of NASA, Washington, DC (US)

(72) Inventor: Craig A. Brice, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 267 days.

(21) Appl. No.: 15/707,479

(22) Filed: Sep. 18, 2017

(65) Prior Publication Data

US 2018/0093327 A1 Apr. 5, 2018

Related U.S. Application Data

(62) Division of application No. 14/463,836, filed on Aug. 20, 2014, now Pat. No. 9,764,386.

(60) Provisional application No. 61/869,297, filed on Aug. 23, 2013.

(51) Int. Cl.
*B22F 7/02* (2006.01)
*B22F 3/24* (2006.01)

(52) U.S. Cl.
CPC .......... *B22F 7/02* (2013.01); *B22F 2003/247* (2013.01); *B22F 2003/248* (2013.01); *B22F 2998/10* (2013.01); *Y02P 10/295* (2015.11); *Y10T 428/12042* (2015.01)

(58) Field of Classification Search
CPC .................. B22F 7/02; B22F 2003/247; B22F 2003/248; B22F 2998/10; Y02P 10/295; Y10T 428/12042
See application file for complete search history.

(56) References Cited

U.S. PATENT DOCUMENTS

| | | | |
|---|---|---|---|
| 8,475,711 B2 | 7/2013 | Wojcik | |
| 9,435,014 B2 | 9/2016 | Rohatgi | |
| 2008/0290141 A1 | 11/2008 | Shaw et al. | |
| 2010/0150767 A1 | 6/2010 | Dunand et al. | |
| 2014/0157768 A1 | 6/2014 | Jardine | |

*Primary Examiner* — Laura C Powers
(74) *Attorney, Agent, or Firm* — Jennifer L. Riley; Robin W. Edwards; Helen M. Galus (57) ABSTRACT

Methods and devices are disclosed for creating a multiple alloy composite structure by forming a three-dimensional arrangement of a first alloy composition in which the three-dimensional arrangement has a substantially open and continuous porosity. The three-dimensional arrangement of the first alloy composition is infused with at least a second alloy composition, where the second alloy composition comprises a shape memory alloy. The three-dimensional arrangement is consolidated into a fully dense solid structure, and the original shape of the second alloy composition is set for reversible transformation. Strain is applied to the fully dense solid structure, which is treated with heat so that the shape memory alloy composition becomes memory activated to recover the original shape. An interwoven composite of the first alloy composition and the memory-activated second alloy composition is thereby formed in the multiple alloy composite structure.

13 Claims, 8 Drawing Sheets

FUNCTIONALLY GRADED METAL-METAL COMPOSITE STRUCTURES

CROSS REFERENCE TO RELATED APPLICATIONS

This patent application is a divisional of and claims the benefit of and priority to U.S. patent application Ser. No. 14/463,836 filed Aug. 20, 2014, which claims the benefit of and priority to U.S. provisional patent application No. 61/869,297 entitled "Functionally Graded Metal-Metal Composite Structures" filed on Aug. 23, 2013, the contents of both applications are hereby incorporated by reference in their entireties.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

From a broad perspective, monolithic metallic materials often suffer from the fact that they are monolithic. In order to improve the properties, alloying additions are made that create secondary phases and/or precipitate structures. These improvements must occur during melt solidification and are governed by the thermodynamics of the process. That is, optimizing the microstructure is possible but only as much as thermodynamics allow.

While various approaches for layering two-dimensional materials exist, their capabilities are typically limited and non-isotropic. Further, while three-dimensional composites may be formed with conventional powder metallurgy processes, it is generally very difficult to control the arrangement of the phases, for example due to randomness created by mixing powders.

BRIEF SUMMARY OF THE INVENTION

The systems, methods, and devices of the various embodiments provide for creation of a multiple alloy composite structure by forming a three-dimensional arrangement of a first alloy composition, infusing the three-dimensional arrangement of the first alloy composition with at least a second alloy composition, and consolidating the three-dimensional arrangement into a fully dense solid structure, in which an original shape of the second alloy composition is set for reversible transformation.

In some embodiment systems, methods, and devices, the three-dimensional arrangement of the first alloy composition has a substantially open and continuous porosity. In some embodiment systems, methods and devices, the second alloy composition is a shape memory alloy. In some embodiment systems, methods and devices, forming the three-dimensional arrangement of the first alloy composition is performed using additive manufacturing. In some embodiments, consolidating the three-dimensional arrangement into a fully dense solid structure includes applying a first heat treatment comprising vacuum heat pressing, trimming the multiple alloy composite structure to consistent dimensions using waterjet cutting, and applying a separate shape setting heat treatment to the multiple alloy composite structure, in which the separate shape setting heat treatment comprises heating the structure, for example to about 500° C. for about 15 minutes.

Embodiment methods may also include mechanically working the fully dense solid structure to alter the structural arrangement of the infused three-dimensional arrangement, and treating the fully dense solid structure with heat such that the shape memory alloy composition becomes memory activated to recover the original shape, in which an interwoven composite of the first alloy composition and the memory-activated second alloy composition is formed.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide methods for creating new metallic cellular structures (periodic and random) across a wide range of alloys. In the various embodiments, the cellular structures may be random (e.g., foam like) or periodic (e.g., non-foam like). In the various embodiments, a three dimensionally controlled macrostructure may be created. In particular, using additive manufacturing, open cell "net structures" are developed, which may be infiltrated with another alloy to create a bi-metallic composite structure. Thus, the various embodiments enable the combination of multiple alloy systems, including those that are not typically melt compatible, to create unique alloy compositions and arrangements not typically available through conventional processing routes.

Such bi-metallic composite structures may be particularly designed to contain shape memory alloys, which have a unique ability to recover small amounts of plastic strain through a temperature induced phase change. For these materials, mechanical displacement may be accomplished by heating the structure to induce a phase change, through which some of the plastic strain previously introduced to the structure can be reversed.

Figure 1:
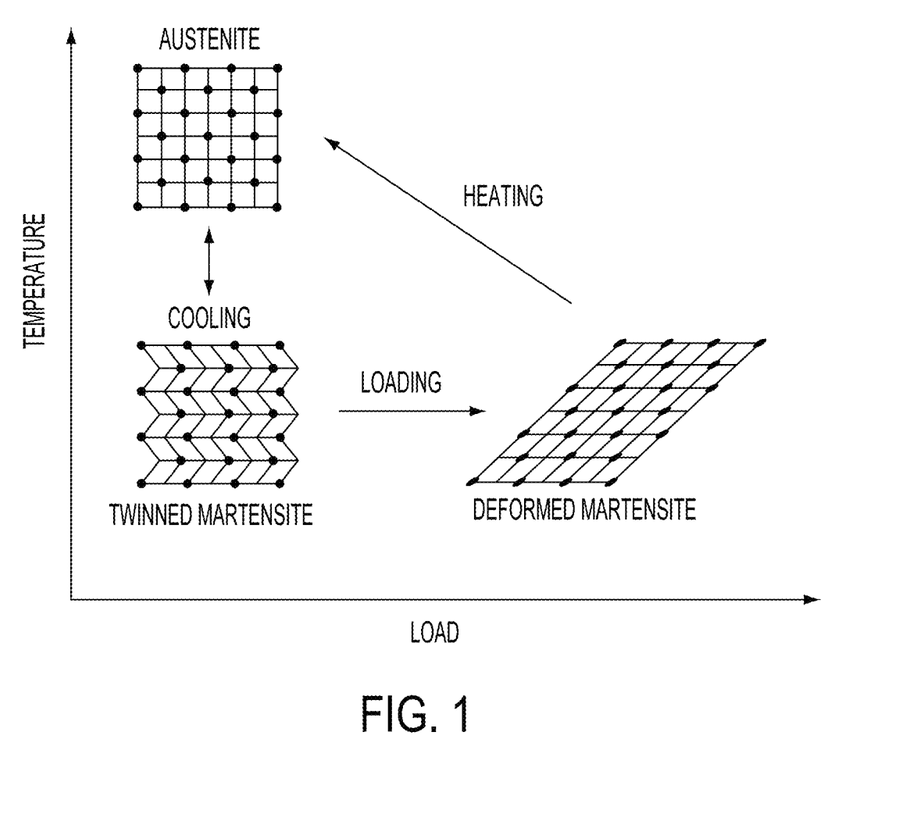
FIG. 1 is a representative diagram of transitions between crystal structures in shape memory alloys.

In particular, a shape memory alloy can exist in two different phases (low temperature/martensite and high temperature/austenite), with three different crystal structures (i.e. twinned martensite, untwinned martensite and austenite), as shown in FIG. 1. Upon cooling, a typical shape memory alloy changes from the austenite phase to the martensite phase, accompanied by twinning (e.g., during cooling as one form becomes unstable and the crystal structure must re-organize or transform into another more stable). Such change to the twinned martensite phase has no net volume change. Deformation may be introduced to the martensite phase, thereby "detwinning" or "untwinning" the crystal. The untwinned martensite crystal may be heated to recover the original austenite crystal structure. The reversion to the original austenite crystal structure may allow some or all of the plastic strain in the material to be reversed. In the various embodiments, this reversion/reversal may enable an internal residual stress field to be created in the various embodiment composite structures, such as the various embodiment multiple alloy/bi-metallic composite structures described herein.

Thus, the unique alloy compositions may contain at least one shape memory alloy, and may be used to create a variety of structural components with beneficial properties.

Stress fields may cause significant impact on properties and performance of various components used across different industries. Specifically, cracks in materials tend to nucleate from a free surface and grow when stress levels exceed the threshold stress intensity factor ($K_{th}$), while below the threshold a crack will not grow.

In the various embodiments, multiple alloy/bi-metallic composite structures may be created such that a residual stress field can be tailored to limit or eliminate the ability of a surface crack to propagate through the structure. The residual stress may be introduced during the processing (e.g., mechanical working and/or shape set memory heat treatment) and may be present irrespective of any applied load. The internal residual stress may counteract an applied load to the multiple alloy/bi-metallic composite structures and slow down and/or eliminate crack nucleation and/or growth.

In an example embodiment, a structural titanium alloy may be employed to create a three dimensionally controlled macrostructure, such as a titanium open cell cellular structure 5 (e.g., a titanium open cell foam). In this manner, a three-dimensional arrangement of a first alloy composition, such as a titanium open cell foam, may be formed. The three-dimensional arrangement of a first alloy composition, such as a titanium open cell foam, may have a substantially open and continuous porosity. A shape memory alloy may be infiltrated into the cellular structure. In this manner, a second alloy composition comprising a shape memory alloy may be infused into the three-dimensional arrangement of the first alloy composition, such as a titanium open cell cellular structure (e.g., a titanium open cell foam). In contrast, combining these alloys in conventional melt processing would destroy the unique characteristics of each alloy through liquid-phase mixing and likely result in a worthless combination. In the example embodiment, the three-dimensional arrangement (i.e., the three dimensional arrangement of the first alloy composition, such as a titanium open cell cellular structure (e.g., a titanium open cell foam), with the second alloy composition infused into it), may be consolidated into a fully dense solid structure, such as consolidated bi-metallic structure, where an original shape of the second alloy composition may be set for reversible transformation. In the example composition, the consolidated bi-metallic structure may be mechanically worked (e.g., by rolling) in order to introduce recoverable strain to the shape memory alloy. Recovery of the strain may subsequently be attempted using heat treatment, which may lead to a net compressive residual stress in the overall bi-metallic composite structure.

Figure 2:
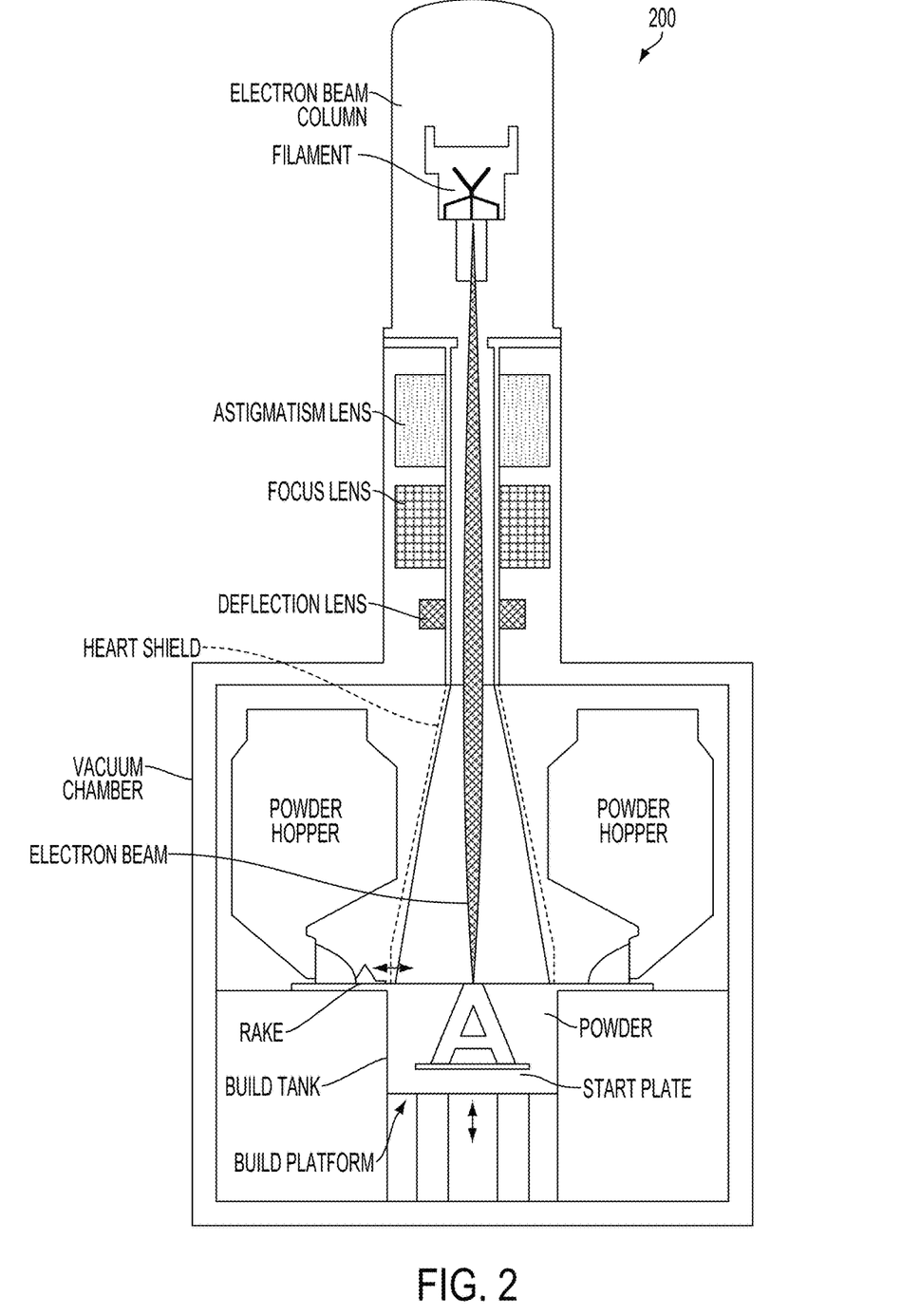
FIG. 2 is a schematic representation of the Arcam electron beam powder bed additive manufacturing system.

In the various embodiments, a first alloy composition, such as a standard titanium alloy (e.g., Ti-6Al-4V), may be used to form a "matrix" component, also referred to herein as a net structure, open cell, foam, alloy matrix, and/or any combination thereof. In some embodiments, the matrix component may be created by additive manufacturing (AM) methods. FIG. 2 illustrates an example additive manufacturing system 200 for creating a matrix net structure. In the system 200, a thin layer of powder may be spread over a substrate and an electron beam is used to melt and fuse the powders together. The substrate platform may increment downward and another thin layer of powder is spread over the previously fused layer. The process may be repeated until a three dimensional structure is created.

Following formation of the matrix component, a second phase alloy may be incorporated into the structure. That is, voids in the matrix structure may be filled with a shape memory alloy powder (e.g., Nitinol (NiTi)), hot-consolidated and shape-set into a fully dense arrangement. The composite structure may then mechanically worked to introduce recoverable plastic strain into both the matrix and the shape memory alloy. Upon memory activation heat treatment, the shape memory alloy may attempt to revert to its original shape-set dimensions (i.e. contract) but may be constrained by the titanium alloy matrix. As a result, a static residual stress field may develop in the structure. Since cracks generally nucleate at a free surface, the compressive field in front of the crack tip as it grows into the structure may inhibit propagation. The stress intensity factor (K) is related to the local stress field ($\sigma$) and crack length (a) by:

$$K=\sigma(\pi a)^{1/2} \qquad \text{(Eq. 1)}.$$

Careful design of the structure and the resultant internal stress field may allow the stress intensity factor to remain below the threshold value, and therefore inhibit any cracks from growing. Additionally, by the nature of the interlocking arrangement of the shape memory alloy/primary alloy composite, any cracks initiating in this area may be contained and isolated from the load-bearing structural layers.

Figure 3:
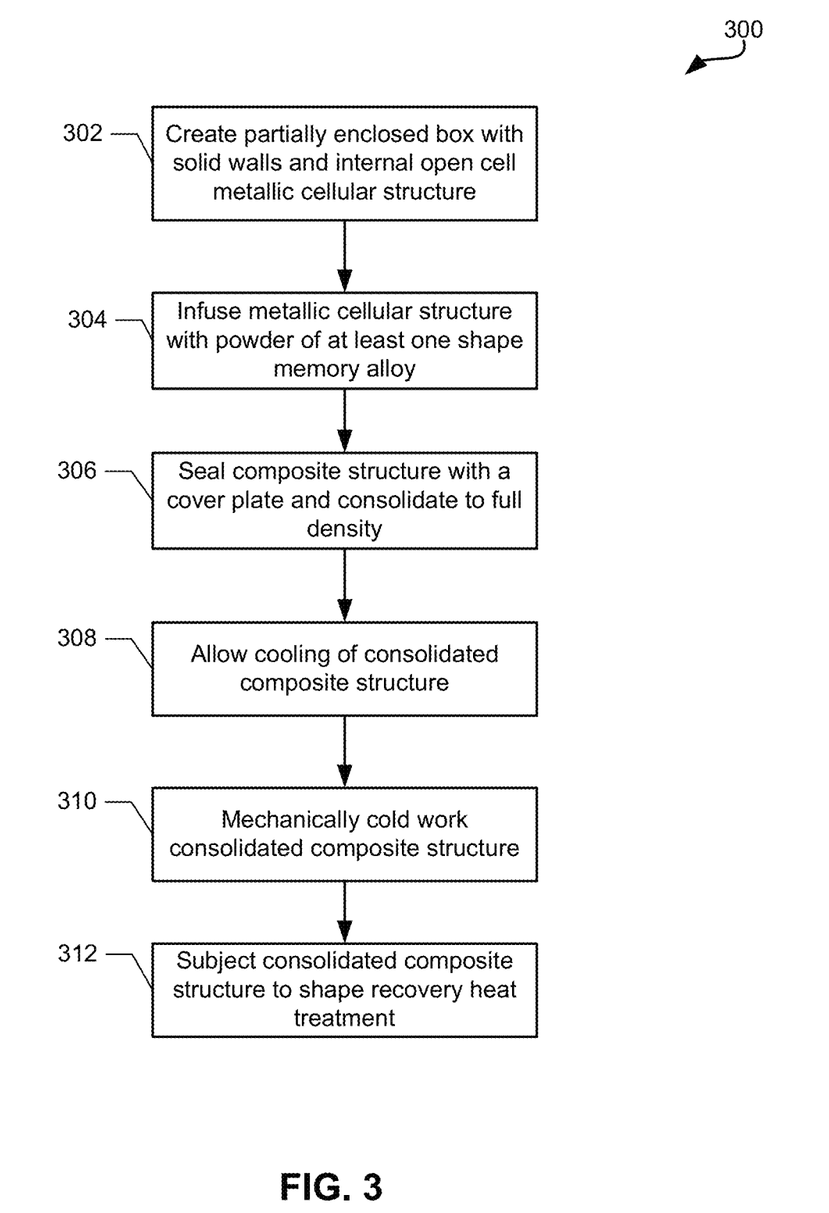
FIG. 3 is a process flow diagram illustrating an embodiment method of creating a multiple alloy composite structure with has a compressive residual stress field.

FIG. 3 illustrates an embodiment method 300 of creating a multiple alloy composite structure with a controlled internal residual stress field. The logic blocks illustrated in FIG. 3 may be performed using a controller/control system that may be configured to implement method 300 by connections (wireless or wired) to any number of different manufacturing machines. In block 302 of method 300, a partially enclosed box with solid walls and an internal open cell metallic cellular structure (e.g., a foam structure, periodic structure, etc.) may be created using additive manufacturing techniques. The metallic cellular structure (e.g., a foam structure, periodic structure, etc.) may be a metal alloy primary phase, for example, a titanium alloy or an aluminum alloy.

In block 304, the metallic cellular structure (e.g., a foam structure, periodic structure, etc.) may be infused with a powder containing at least one shape memory alloy (e.g., Nitinol), thereby creating a co-continuous second phase in the composite structure. In block 306, the composite structure may be sealed with a cover plate and consolidated to full density, thereby "setting" the shape memory alloy in an original shape (i.e., austenite structure) for later reversible transformation. In some embodiments, the consolidation to full density may be performed using hot isostatic pressing. In an embodiment, the shape setting may include heating the structure to various temperatures for various times, such as to about 500° C. for about 15 minutes. In an embodiment, the shape setting heat treatment selected, the temperature of the treatment, and the time of the treatment may be selected based on the shape memory alloy selected, and different shape memory alloys may receive different shape setting heat treatments at different temperatures and/or for different times. For example, a nickel-titanium composition may be heated to about 500° C. for about 15 minutes, while a different composition may be heated to a higher or lower temperature and/or for a shorter or longer time.

In block 308, the consolidated composite structure may be allowed to cool (e.g., transition to martensite twinned structure). In block 310, the composite structure may be mechanically cold worked through rolling such that the limit for recoverable strain in the shape memory alloy is reached (e.g., about 8% plastic strain for Nitinol). In other words, deformation to the composite structure may cause detwinning of the martensite structure. In block 312, the composite structure may be subjected to shape recovery heat treatment, thereby causing the shape memory alloy to attempt to revert to the original shape that was set prior to rolling (i.e., transition back to austenite structure). Since the shape memory alloy may be constrained by the metal alloy primary phase, the resulting composite structure may be a layered structure with outer walls formed by a solid monolithic metal alloy (e.g., titanium alloy), and an interior structure formed by an interwoven composite of the metal alloy (e.g., titanium alloy) and the shape memory alloy (e.g., Nitinol). In various embodiments, the multiple alloy composite structure created by method 300 may have a net compressive residual stress field.

Based on their advantageous qualities, the embodiment multiple alloy composite structures may be used to form parts in a number of practical applications. One example application may include use in pressure vessels (e.g. propellant tanks) that are subject to sustained unidirectional pressure loads (i.e., hoop stresses) where the residual stress field could reduce the overall net effective stress and allow the tank to be either thinner or carry higher pressure. Another example application may include improving the fatigue performance of structural aerospace components through crack closure and/or turning. Other example applications may include uses for ballistic impact resistant structures, such as micrometeoroid protection is space habitats, protective vehicle/personnel armor, etc.

Additionally, the various embodiments of the multiple alloy composite structures may be used for various acoustic applications. In particular, transmission of sound through a structure is based on the acoustic impedance of that particular material. Since monolithic materials have unique and well defined acoustic impedances, in various embodiments a tailored structure may be created that uses a combination of materials with very different impedance and at the same time arranges these materials in a manner that results in acoustic attenuation. The various embodiment structures may be used for limiting sound transmission into the cabin and in other applications where quieter acoustics are important (naval propellers, etc).

Further variations of the embodiment methods may be used to create composite structures of other materials, including metallic glass alloys.

The various embodiments may be understood by reference to the following non-limiting example, which is provided by way of illustration.

EXAMPLE

An Arcam electron beam melting (EBM) additive manufacturing machine at the W. M. Keck Center for 3D Innovation at the University of Texas at El Paso was used to make matrix net structure "coupons" (also referred to as metal foam or open cell structures/components) using a primary alloy.

Figure 4A:
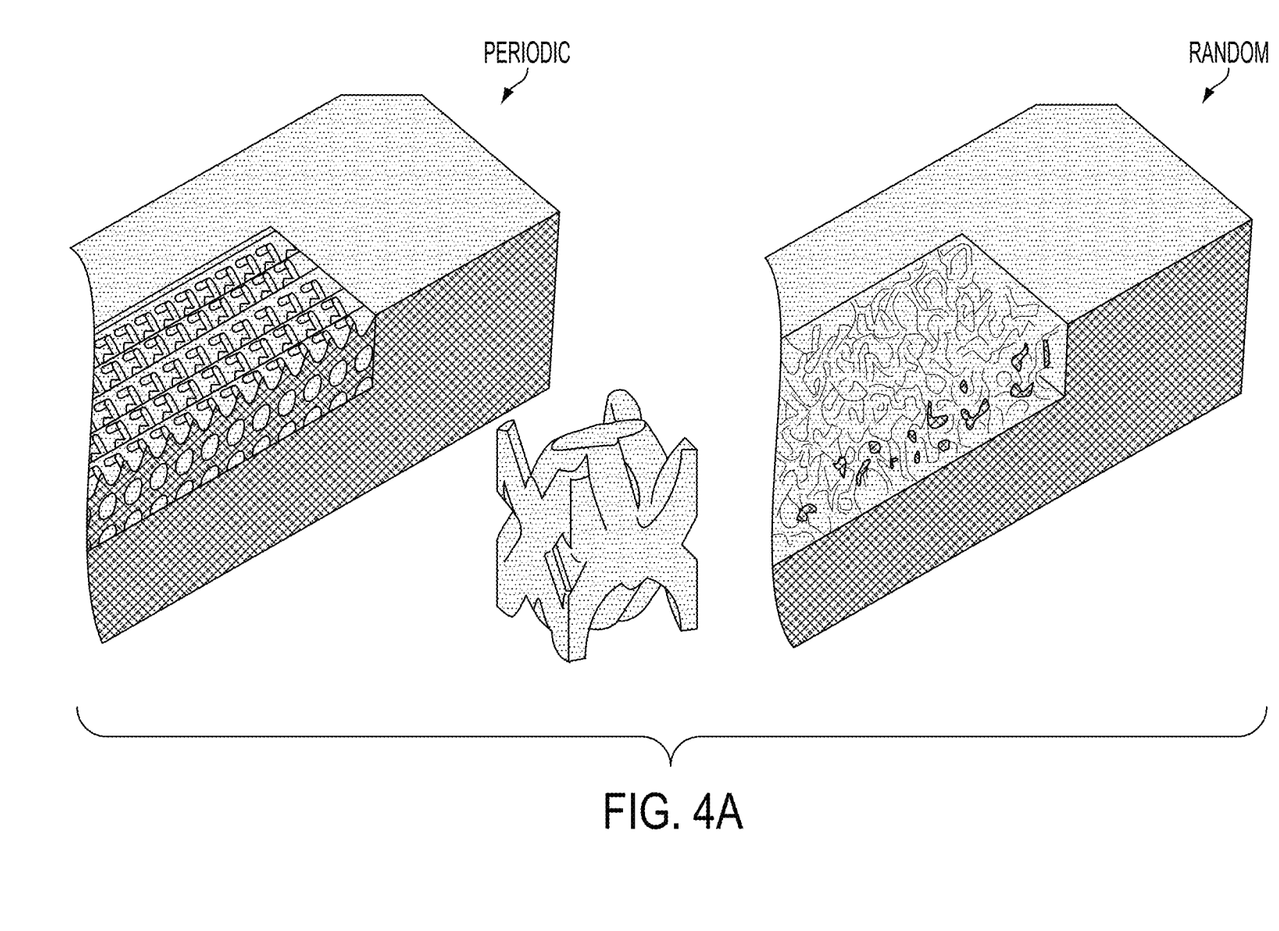
FIG. 4A is a schematic representation of cut-away sections of open net structures having periodic and random test coupon designs.
Figure 4B:
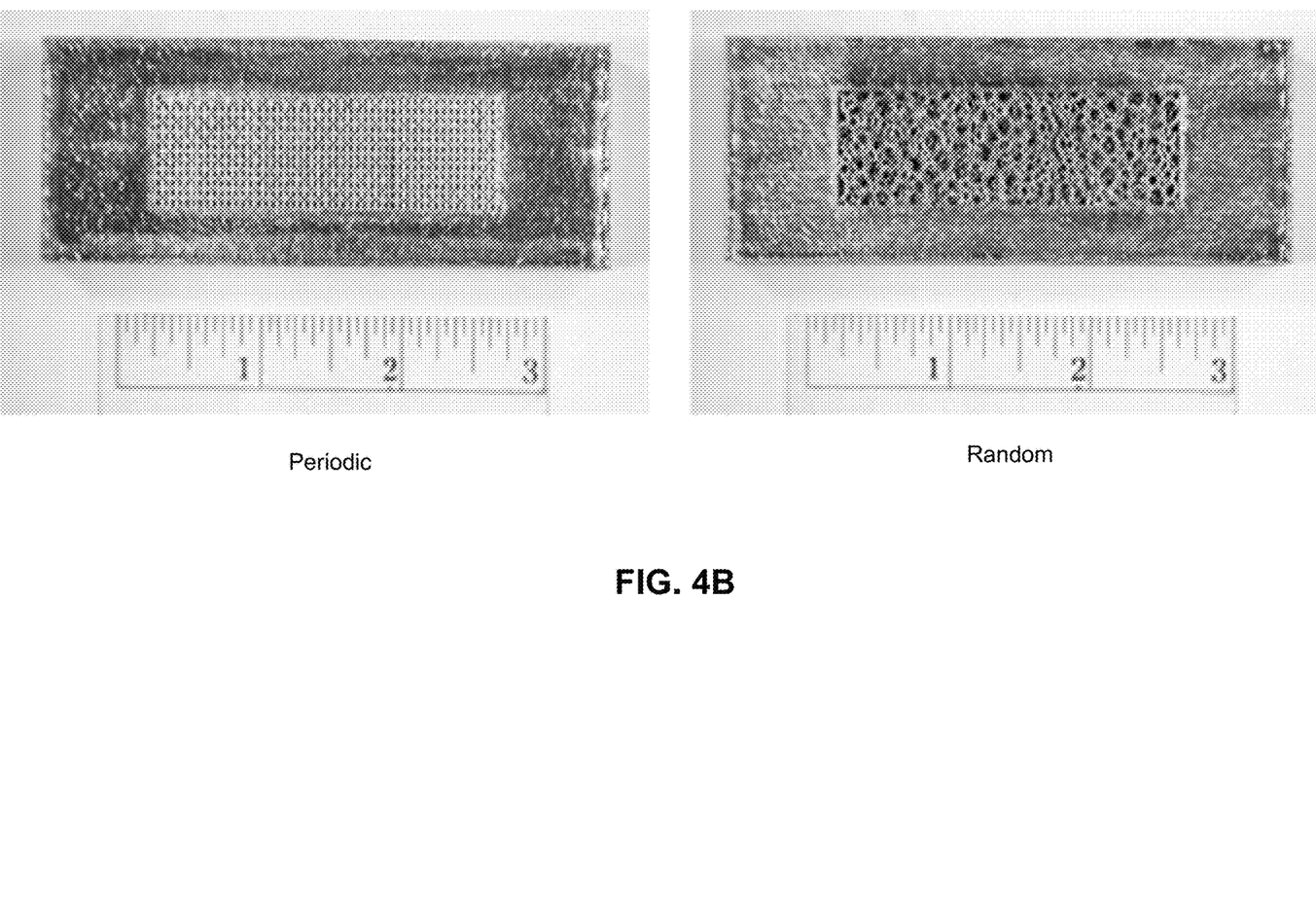
FIG. 4B is a side view of cross-sections of periodic design and random design test coupons fabricated using electron beam melting.

Two different designs were constructed, one using a periodic net structure and one using a random structure. The periodic structure was designed using a three-dimensional computer-aided design (CAD) modeling program, while the random structure was reverse-engineered using X-ray computed tomography from a piece of cast aluminum foam. FIG. 4A illustrates a cut away section of the CAD model design of the periodic structure and a cutaway section of the reverse-engineered random structure. FIG. 4B shows cut away sections of the actual periodic structure and random structure coupons fabricated in Ti-6Al-4V using the Arcam EBM process. The coupons were 1.18 inches wide by 3.90 inches long by 0.48 inch thick, with net structure areas of approximately 0.60 inch wide by 2.35 inches long by 0.20 inch thick.

The open cell net structure area of the coupons was filled with Nitinol shape memory alloy (SMA) powder. The SMA powder was 54.6 wt % Ni and 45.4 wt % Ti. The mesh size used was −140. The powder was poured into the void area in the net structure scaffolding and vibrated for a period of 15 minutes such that the powder could achieve peak tap density. A piece of wrought Ti-6Al-4V alloy plate (about 1.17 inches wide by about 3.90 inches long by about 0.22 inch thick) was then used to cover the top surface of the coupon and the entire structure was vacuum hot pressed at 930° C. for 4 hours at 1,000 psi.

One of the hot pressed samples was examined via X-radiography in order to confirm that the filling and consolidation procedure yielded a void-free structure (>99% density).

Figure 5:
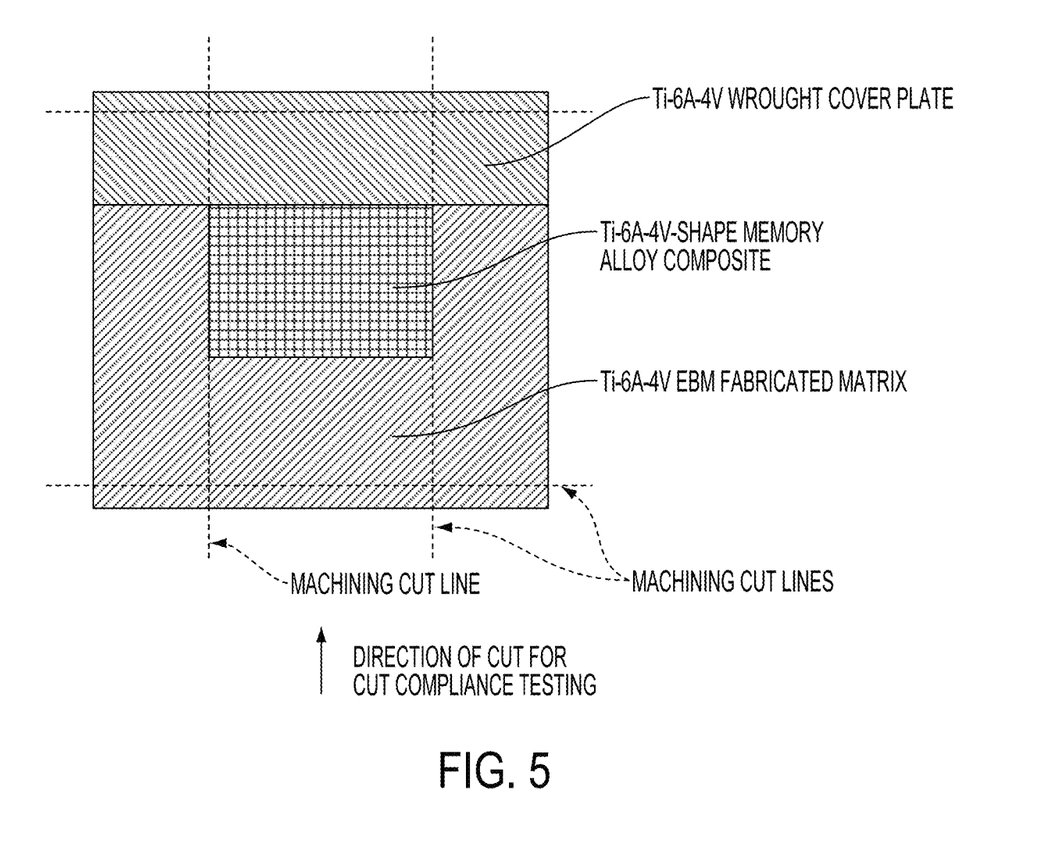
FIG. 5 is a schematic representation of a cross-section configuration of test coupons prepared for cut compliance testing.

The samples were machined using traditional milling techniques to achieve a final sample width of 0.61 inch and a final thickness of 0.53 inch. This machining operation removed the excess matrix material from the outer edges leaving a two-dimensional laminate of Ti-6Al-4V EBM matrix, Ti-6Al-4V-SMA composite, and Ti-6Al-4V wrought plate. FIG. 5 illustrates a cross-section of the resulting coupon structures with cut lines to indicate the final cross-sectional geometry.

The resulting coupon structures were then subjected to shape-set heat treatment at 500° C. for 15 minutes, followed by furnace cooling. The coupon structures were cold rolled on a two-high laboratory rolling mill using a multi-pass procedure to an approximate overall reduction of 4%, introducing plastic strain. The samples were monitored between passes to ensure that the overall temperature stayed below the austenite start temperature of 68° C. After the rolling operation, one sample from each of the designs was subjected to a memory activation heat treatment at 115° C. for 15 minutes.

Three of the coupons were sent to Hill Engineering, LLC, in Rancho Cordova, Calif., as samples for cut compliance residual stress testing. Sample A was a baseline control created using a periodic design open cell structure, was cold rolled to a 4% reduction, and was not subjected to memory activation heat treatment. Sample B was created using a periodic design open cell structure, was cold rolled to 4% reduction and subsequent subjected to memory activation heat treatment. Sample C was created using a random design open cell structure, was cold rolled to 4% reduction, and subsequently subjected to memory activation heat treatment.

Cut compliance testing was performed at the approximate mid-point of each sample and the residual stress on the transverse plane was determined using strain gages.

Figure 6:
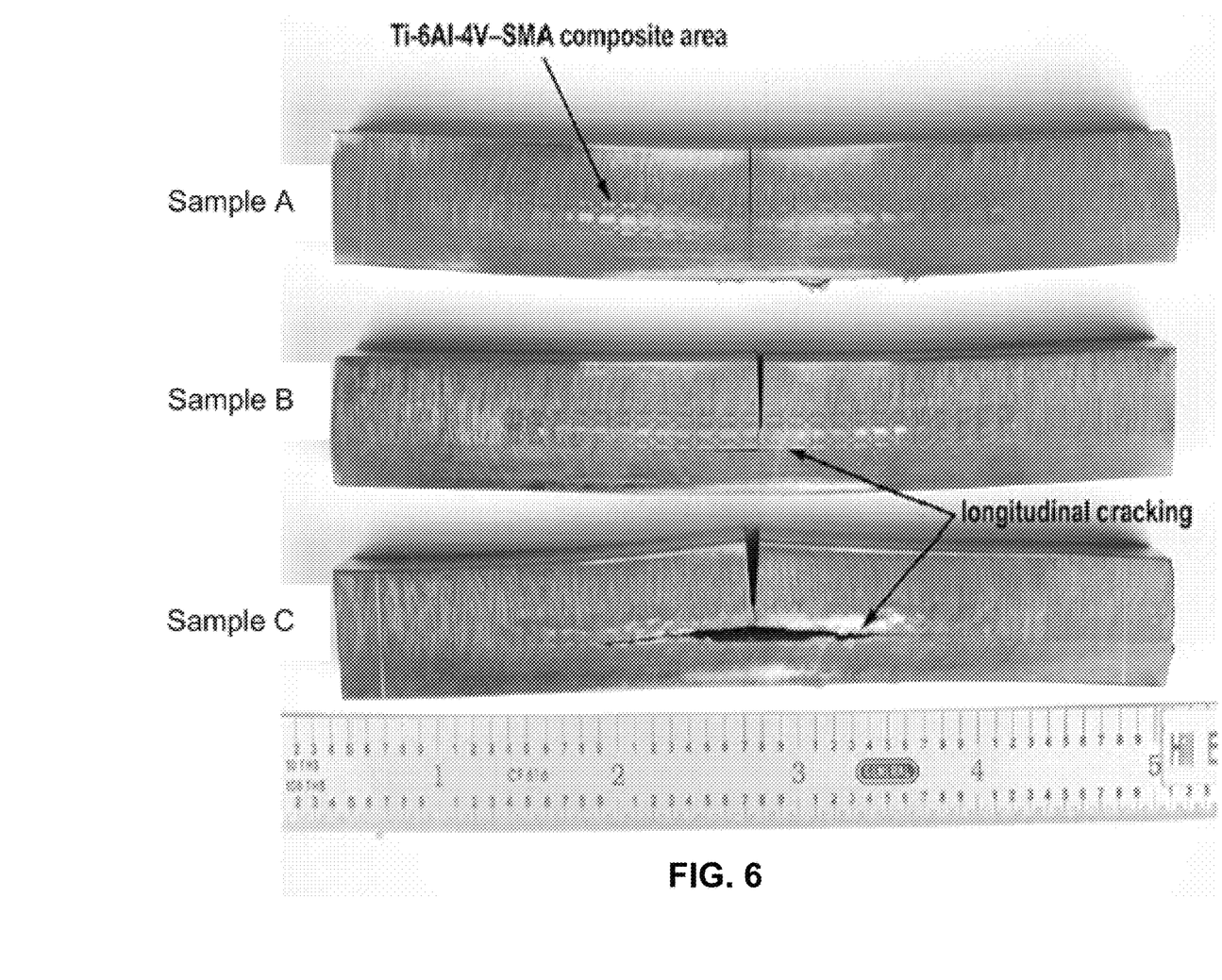
FIG. 6 is a side view of three as-tested cut compliance coupons that present different combinations of open net structure designs and memory activation heat treatment.

FIG. 6 shows a visual comparison of the cut compliance tested samples A, B and C. For cut compliance testing, wire electro-discharge machining (EDM) is used to make the cut through the sample beginning at the top surface (relative to the image) and progressing down through the sample. In Sample A, the cut is visible and the kerf gap at the beginning of the cut is 0.017 inch wide. Further, Sample A has slight concave curvature, which is due to the cold rolling procedure and the elastic/plastic mismatch between the matrix Ti-6Al-4V alloy and the Ni—Ti shape memory alloy. In Sample B the top of the EDM kerf has opened further (0.033 inch) due to stress relief as material is removed during the cutting process. Further, a longitudinal crack between the bottom surface of the composite net structure area and the Ti-6Al-4V cover plate is also evident in Sample B.

These visual indications show that significant residual stress was introduced into the parts that have the SMA activated, and these stresses were relieved through the EDM cutting operation. In Sample C, a much greater release of internal energy is shown by the significant kerf opening on the top of the sample (0.076 inch) and the long longitudinal crack at the net structure/cover plate interface. Further, release of residual stress in Sample C has turned it from concave to convex.

Figure 7:
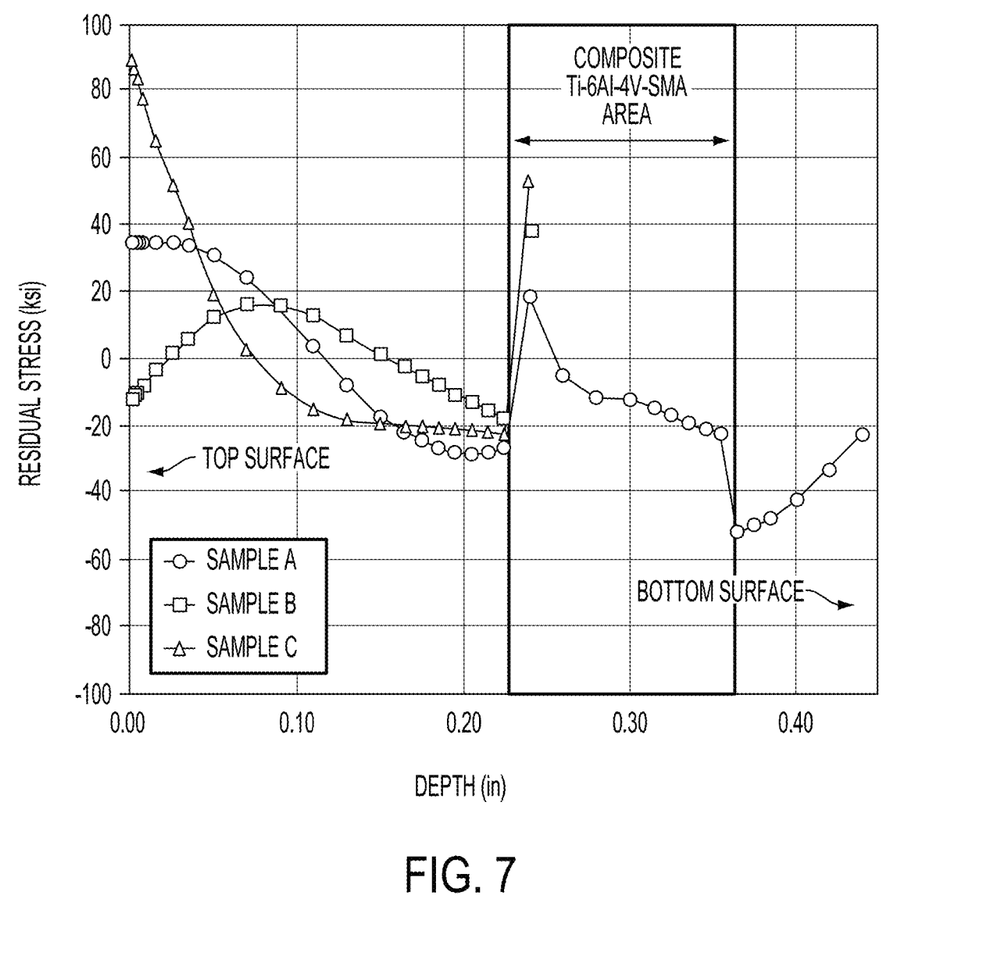
FIG. 7 is a graph illustrating residual stress results as a function of depth from the top surface of the cover plate structure.

FIG. 7 illustrates the test data from the cut compliance testing of Samples A, B and C is shown in FIG. 5. The depth indicated on the abscissa is relative to the surface of the specimen where the EDM cut began. The interface between the solid Ti-6Al-4V matrix and the composite Ti-6Al-4V-SMA area occurs at about 0.22 inch. The data set labeled Sample A is from the control sample with the periodic net structure that was cold rolled but not subjected to the memory activation heat treatment. The data indicates that the rolling process itself has introduced a residual stress field in the part. The difference in elastic modulus (16,000 ksi for Ti-6Al-4V versus 5,800 ksi for Ni—Ti) contributes to this residual stress field in the as-rolled condition. The data set labeled Sample B is from the coupon with the same internal configuration as the control with the addition of the memory activation heat treatment after the rolling operation. The memory activation heat treatment changes the residual stress near the surface from +35 ksi to −10 ksi demonstrating a clear effect from the constrained SMA component. The data set labeled Sample C is from the random open net structure, and the data show that the residual stress profile is significantly different compared to the periodic net structure. In this case, the near-surface residual stress is +90 ksi, approximately 75% of the yield stress of Ti-6Al-4V.

These data demonstrate that the memory activated, fully constrained shape memory alloy material imparts an internal stress to the matrix material. The data also demonstrate that the structural configuration of the Ti-6Al-4V-SMA composite area can change the character and magnitude of the stress field generated. These results suggest that a controlled residual stress field could be designed into a structure using bi-metallic composite configurations.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

As discussed herein, a processor may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into a processor. A processor may include internal memory sufficient to store the application software instructions. In many devices the internal memory may be a volatile or nonvolatile memory, such as flash memory, or a mixture of both. For the purposes of this description, a general reference to memory refers to memory accessible by a processor including internal memory or removable memory plugged into the device and memory within the processor itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented using control system hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

A control system that may be used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A bi-metallic composite material, comprising:
   a three-dimensional interior portion comprising a first alloy composition infused with a shape memory alloy composition and consolidated into a fully dense composite, wherein the shape memory alloy composition is held in a constrained shape other than an original shape by the first alloy composition, the original shape being a shape to which the shape memory alloy composition is reverting from the constrained shape thereby generating a net compressive residual stress field in the three-dimensional interior portion; and
   a three-dimensional exterior portion surrounding the three-dimensional interior portion and comprising solid load-bearing structural walls.

2. The bi-metallic composite material of claim 1, wherein the three-dimensional exterior portion is a box structure.

3. The bi-metallic composite material of claim 2, wherein the box structure is partially enclosed and includes a cover plate.

4. The bi-metallic composite material of claim 3, wherein the bi-metallic composite material is configured to form structural components in order to eliminate or at least limit propagation of surface cracks in the structural components.

5. The bi-metallic composite material of claim 1, wherein the shape memory alloy composition comprises a nickel titanium alloy.

6. The bi-metallic composite material of claim 1, wherein the first alloy composition comprises at least one of titanium and aluminum.

7. The bi-metallic composite material of claim 5, wherein the nickel titanium alloy contains approximately equal atomic percentages of nickel and titanium.

8. The bi-metallic composite material of claim 1, wherein the bi-metallic composite material is made by additive manufacturing.

9. The bi-metallic composite material of claim 1, wherein the net compressive residual stress field limits or eliminates nucleation and/or growth of a surface crack in the three-dimensional exterior portion by counteracting an applied load to the exterior portion.

10. A bi-metallic composite material, comprising:
    a three-dimensional interior portion comprising a first alloy composition infused with a shape memory alloy composition and consolidated into a fully dense composite, wherein the shape memory alloy composition is held in a constrained shape other than an original shape by the first alloy composition, the original shape being a shape to which the shape memory alloy composition is reverting from the constrained shape thereby generating a net compressive residual stress field in the three-dimensional interior portion, wherein the first alloy composition comprises at least one of titanium and aluminum, and wherein the shape memory alloy composition comprises a nickel titanium alloy; and
    a three-dimensional exterior portion surrounding the three-dimensional interior portion and comprising solid load-bearing structural walls,
    wherein the net compressive residual stress field limits or eliminates nucleation and/or growth of a surface crack in the three-dimensional exterior portion by counteracting an applied load to the three-dimensional exterior portion.

11. The bi-metallic composite material of claim 10, wherein the nickel titanium alloy contains approximately equal atomic percentages of nickel and titanium.

12. The bi-metallic composite material of claim 10, wherein the bi-metallic composite material is made by additive manufacturing.

13. The bi-metallic composite material of claim 10, wherein the three-dimensional exterior portion comprises the first alloy composition consolidated into a fully dense state.

* * * * *